Feb. 22, 1955  L. R. DAWSON  2,702,788
WELL DRILLING MUDS AND IMPROVED COMPOSITIONS
FOR PRODUCING THE SAME
Filed June 4, 1951  2 Sheets-Sheet 1
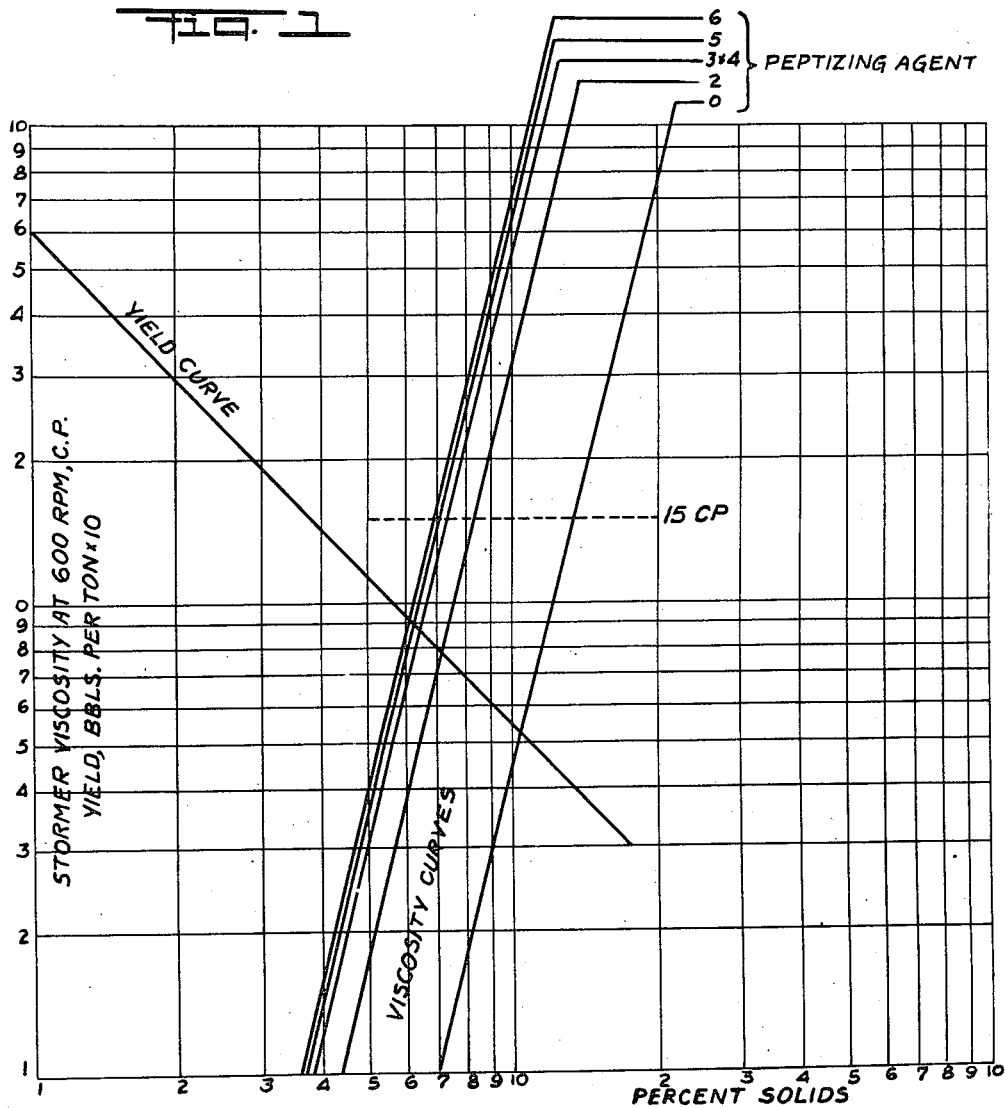
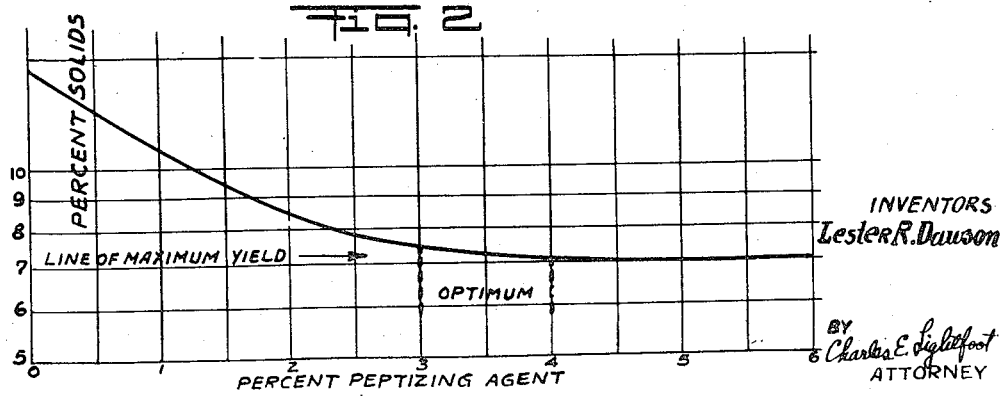
INVENTORS
Lester R. Dawson
BY
Charles E. Lightfoot
ATTORNEY Feb. 22, 1955 L. R. DAWSON 2,702,788
WELL DRILLING MUDS AND IMPROVED COMPOSITIONS
FOR PRODUCING THE SAME
Filed June 4, 1951 2 Sheets-Sheet 2
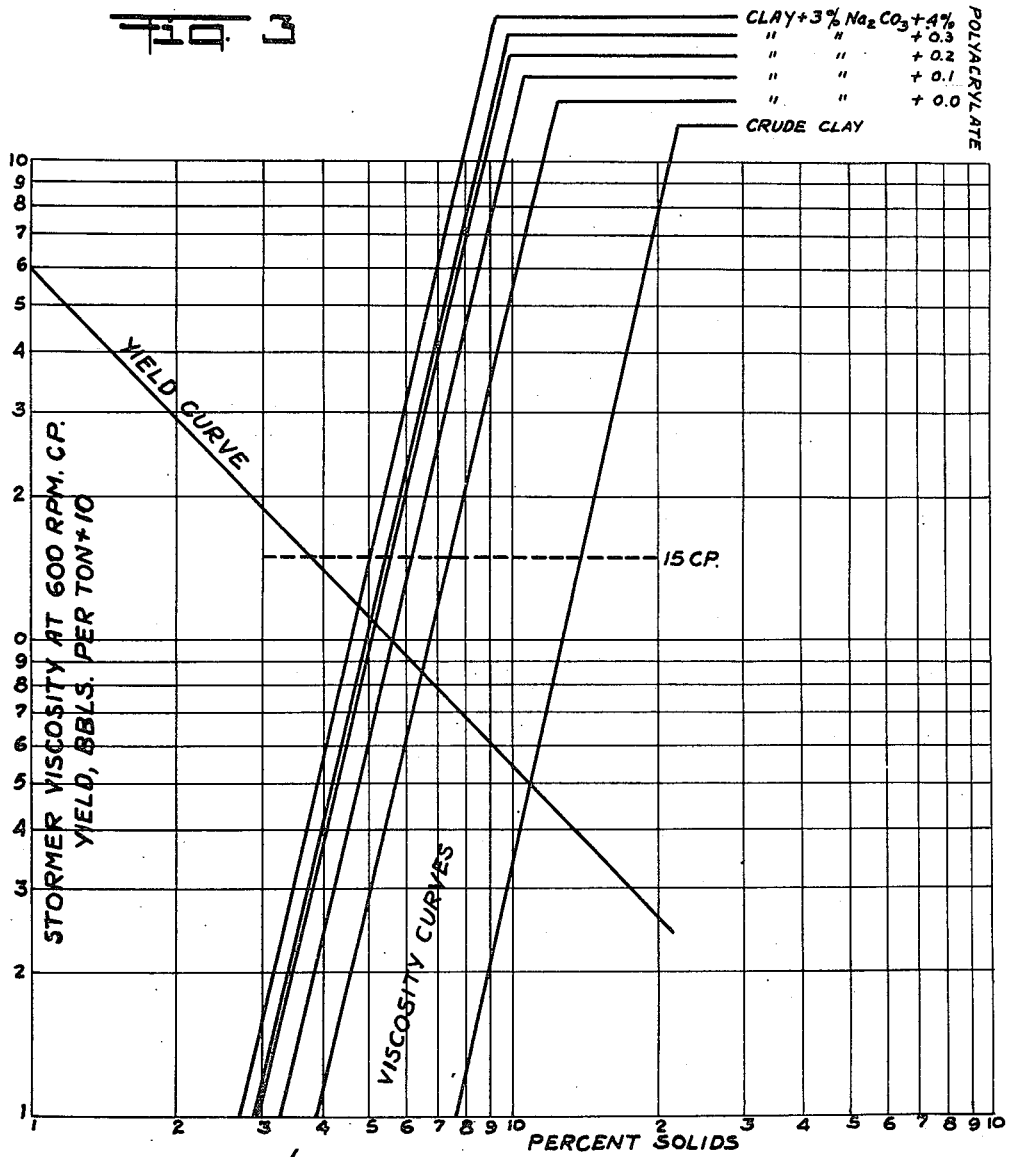
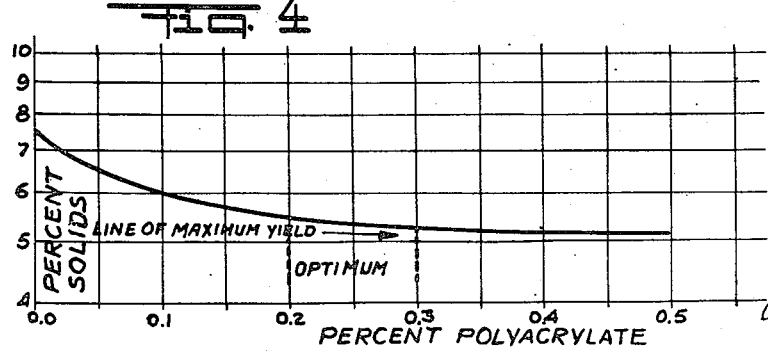
INVENTORS
Lester. R. Dawson
BY Charles E. Lightfoot
ATTORNEY

UNITED STATES PATENT OFFICE 2,702,788
Patented Feb. 22, 1955

2,702,788

WELL DRILLING MUDS AND IMPROVED COMPOSITIONS FOR PRODUCING THE SAME

Lester R. Dawson, Houston, Tex., assignor to The Milwhite Company, Inc., Houston, Tex., a corporation Application June 4, 1951, Serial No. 229,710

8 Claims. (Cl. 252—8.5)

This invention relates to well drilling muds and improved compositions for producing the same.

The invention finds particular application in the drilling of oil wells by the rotary process, wherein the use of drilling fluids of widely varying composition is well known. Such drilling fluids are customarily circulated in the well for the purpose of providing lubrication during the drilling operation, and to remove the detritus produced, as well as for sealing porous formations to reduce the loss of fluid into such formations and to prevent caving.

Drilling fluids or muds of this character are frequently made from the clay and mud bases of commerce having gel forming characteristics such as those of bentonitic or sub-bentonitic character. Material of this kind, when desired for use in the production of drilling mud, is generally purchased on the basis of its yield, the yield of clay being defined as the number of barrels of 15 centipoise mud that can be made from one ton of clay, with the clay suspension having gel properties, water loss and pH comparable to those of a standard clay of known composition.

In general, clays suitable for drilling mud production may be classified according to two types, i. e., those known as Wyoming or bentonitic clays and those which may be designated as native or sub-bentonitic clays. Bentonitic clays are usually superior to those of the sub-bentonitic variety, in that the former give a much higher yield of mud than do the latter.

Actual laboratory tests made with typical clays of the bentonitic and sub-bentonitic types have shown that a yield of from 80 to 100 barrels of 15 centipoise mud per ton of clay is obtainable with bentonitic clays, while those of the sub-bentonitic type produce only from 30 to 80 barrels of 15 centipoise mud per ton of clay.

Where large quantities of muds are used, as in the drilling of oil wells, it is apparent, therefore, that the mud forming properties of the raw materials employed are significant factors in the cost of the drilling operation, and any means for increasing the yield obtainable becomes of major importance.

It is an important object of this invention to provide a method and means for improving the mud forming characteristics of clays used in the production of well drilling muds, and more especially for increasing the yield of mud obtainable from such materials.

The invention also contemplates the provision of an improved composition for making drilling muds, whereby higher yields of mud are possible than could be obtained heretofore from raw materials of the same quality.

A further object of the invention is to provide a composition for use in making drilling muds whereby the properties of low quality drilling muds may be improved and raw materials of relatively poor mud forming characteristics may be employed to produce drilling muds of high quality.

A further object of the invention is the provision of means for improving the mud forming properties of sub-bentonitic clays, whereby the same may be used to produce drilling muds having properties equal to or better than those made from bentonitic clays.

Another object of the invention is to provide a drilling mud for use in oil well drilling operations which possesses improved physical characteristics due to the use therein of ingredients having the property of greatly increasing the viscosity of the mud.

A still further object of the invention is the provision of means whereby inert materials of wide variety, capable of giving weight and body to drilling fluid may be employed in the production of drilling fluids of high quality.

The manner in which the invention is carried out and the results obtained thereby are graphically represented in the annexed drawings wherein:

Figure 1 is a diagram showing the results obtained by the use of a peptizing agent with typical clays employed for the production of drilling muds;

Figure 2 is a diagram indicating the effect of the addition of a peptizing agent to a typical clay used in the production of drilling mud;

Figure 3 is a diagram indicating the improvement obtained by the use of the invention in its application to clays for drilling mud use; and Figure 4 is a diagram indicating the effect of the treatment in accordance with the invention of typical clays used in the production of drilling mud.

Various agents and methods have been employed heretofore for improving the properties of drilling muds, and particularly for increasing the yield of mud obtainable from the clays used for this purpose. One method widely employed is to add to the clay or mud a peptizing agent such as soda ash, whereby the yield is appreciably increased. A typical crude sub-bentonitic clay, for example, from which a yield of 38 barrels of 15 centipoise mud per ton of clay was obtainable, was treated by adding 3 per cent of soda ash, and the yield of the resulting product was thereby increased to 74 barrels of 15 centipoise mud per ton. By such treatment it is possible to greatly improve the yield characteristics of various clays used in the production of drilling muds, and sub-bentonitic clays may be improved to the extent that the yield obtainable is equal to or better than that obtainable with clays of the bentonitic type.

The addition of five per cent or less of soda ash to the clay is effective to substantially increase the yield of mud obtainable per ton of clay.

The difference in yield characteristics between the bentonitic clays and those of the sub-bentonitic type has been explained in part on the basis of the differences in their chemical compositions. Crude sub-bentonitic clays have been found to be largely mixtures of sodium and calcium or magnesium clays, while the bentonitic clays are sodium clays. The improvement of the sub-bentonitic clays, resulting from the addition thereto of a peptizing agent such as soda ash, may therefore be roughly expressed by the following chemical reactions:

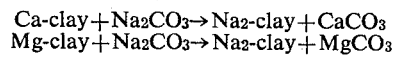

$$Ca\text{-clay} + Na_2CO_3 \rightarrow Na_2\text{-clay} + CaCO_3$$
$$Mg\text{-clay} + Na_2CO_3 \rightarrow Na_2\text{-clay} + MgCO_3$$

In this manner a substantial part of the calcium and/or magnesium of the sub-bentonitic clays may be replaced by sodium, giving the treated clay characteristics comparable to those of the bentonitic type.

While it is possible greatly to improve the yield obtainable with various clays in the making of drilling mud by the addition of a suitable peptizing agent alone, the use of such an agent is limited by considerations of the cost involved, and the fact that little, if any, improvement results from the addition of more than the optimum percentage of the peptizing agent.

It has been discovered that the addition of a small amount of a water soluble polyacrylate, such as the sodium salt of polyacrylic acid, to a clay suitable for the production of drilling mud, affects the properties of the clay in a hitherto unsuspected manner, and to an extent far beyond that which would be expected or predictable.

The treatment of clays with polyacrylates results in a remarkable increase in the viscosity of the drilling mud produced, and, therefore, increases the yield of mud obtainable.

In general, any water soluble salt of polyacrylic acid may be used as an addition agent to clays for improving the properties of the same for the production of drilling muds, and in particular the alkali, alkaline earth and ammonium salts of polyacrylic acid and mixtures of these salts, have been found especially suitable for this purpose, and have proven satisfactory in actual use.

The addition to the clay of five-tenths of one per cent or less of a water soluble salt of polyacrylic acid, is effective to substantially increase the yield of mud obtainable per ton of clay. Thus the yield of mud obtainable from a typical bentonitic clay used in making drilling mud was increased from 88 barrels per ton to 162 barrels per ton by the addition of 0.2 per cent of a water soluble salt of polyacrylic acid alone.

The yield of sub-bentonitic clays is similarly improved by the addition of polyacrylates alone.

Referring to the accompanying drawings, the diagram shown in Figure 1 illustrates graphically the effect of the treatment of a clay typical of those used for making drilling muds with a peptizing agent. From this diagram it is readily seen that an increase in the amount of peptizing agent results in a marked increase in the yield of mud which is obtainable per ton of clay.

In the diagram of Figure 2, a curve is shown which indicates the effect produced by increasing the amount of the peptizing agent used. Thus, an increase in the amount of the peptizing agent results in a steady increase in the yield of mud obtainable, until a maximum yield is reached with about five per cent of the peptizing agent. This graphical representation indicates clearly that an addition to clays of a peptizing agent up to a certain percentage produces an important improvement in the yield of mud obtainable, but that above the optimum percentage of the peptizing agent no significant improvement takes place.

The diagram of Figure 3 illustrates the improved results obtained by the use of a typical water soluble salt of polyacrylic acid and an optimum quantity of peptizing agent with a typical clay results in a great increase of the yield of mud obtainable per ton of clay. From this diagram it will be plainly seen that the yield of mud obtainable upon addition of water soluble polyacrylates to the clay containing the optimum quantity of peptizing agent is remarkably and unexpectedly higher than that obtainable by the use of the peptizing agent alone.

In Figure 4 there is shown a curve similar to that of Figure 2, which illustrates the results obtainable by increasing the amount of polyacrylate used with the optimum quantity of peptizing agent. This graphical representation shows that the yield of mud obtainable increases increases steadily with an increase in the amount of polyacrylate up to a certain percentage of the polyacrylate.

The composition contemplated by the invention may also be used as an addition material to drilling muds containing other ingredients than those hereinbefore mentioned to improve the physical characteristics of the same.

By way of example, it was found that a typical drilling and containing Quebracho and caustic soda required only half as much of a bentonitic clay containing 0.2 per cent of polyacrylate, as of the bentonitic clay alone, to produce the same increase in viscosity of the drilling mud.

It is within the purview of the invention to employ any suitable inert materials by which weight and body may be imparted to drilling fluids, and to combine with such materials an ingredient such as a water soluble salt of polyacrylic acid, whereby a satisfactory yield of drilling composition is obtained having the desired properties, such as high viscosity.

It will be apparent from the above description of the invention that the same constitutes a simple, inexpensive and effective means of improving the properties of the clays used for the production of drilling muds, as well as providing a composition which may be added to drilling muds for controlling the properties of the same while such muds are being used in the drilling operation.

It will also be appreciated that the invention is susceptible of various modifications and that the same is not to be limited strictly to the specific materials, proportions or manner of use set forth except in so far as the same is limited by the scope of the appended claims.

Having thus clearly described the invention what is claimed as new and desired to secure by Letters Patent is:

1. A composition for use in the production of drilling mud consisting of about three per cent of soda ash, about two-tenths of one per cent of the sodium salt of polyacrylic acid, and the remainder a sub-bentonitic clay of the type whose mud forming characteristics are substantially improved by the addition of soda ash.

2. A composition for use in the production of drilling mud consisting of from an effective amount to about five per cent of soda ash, from an effective amount to about five-tenths of one per cent of a water soluble salt of polyacrylic acid, and the remainder a sub-bentonitic clay of the type whose yield of mud is substantially increased by the addition of soda ash.

3. The method of improving sub-bentonitic clay for use in the production of drilling mud to increase the yield of mud obtainable therefrom, which comprises adding to a sub-bentonitic clay of the type whose yield of mud is substantially increased by the addition thereto of soda ash an effective amount up to about five per cent of soda ash, and an effective amount up to about five-tenths of one per cent of a water soluble salt of polyacrylic acid.

4. The method of improving sub-bentonite clay for use in the production of drilling mud to increase the yield of mud obtainable therefrom, which comprises adding to a sub-bentonitic clay of the type whose yield of mud is substantially increased by the addition thereto of soda ash about three per cent of soda ash and about two-tenths of one per cent of the sodium salt of polyacrylic acid.

5. A composition for use in the production of drilling mud consisting of from an effective amount to about five per cent of soda ash, an amount sufficient to substantially increase the yield of mud obtainable but less than about five-tenths of one per cent of a soluble salt of polyacrylic acid, and the remainder a sub-bentonitic clay of the type whose yield of mud is substantially increased by the addition thereto of soda ash.

6. The method of improving the yield of drilling mud obtainable from a sub-bentonitic clay of the type whose yield of mud is increased by the addition thereto of soda ash which comprises adding to the clay from an effective amount to about five per cent of soda ash and an amount sufficient to substantially increase the yield of mud obtainable but less than about five-tenths of one per cent of a soluble salt of polyacrylic acid.

7. The method of improving the properties of clays of the sub-bentonitic type to render such clays comparable to clays of the Wyoming bentonite type which comprises adding to a sub-bentonitic clay of the type whose yield of mud is substantially increased by the addition thereto of soda ash from an effective amount to about five per cent of soda ash and from an effective amount to about five-tenths of one per cent of a water soluble salt of polyacrylic acid.

8. An improved composition having properties comparable to those of bentonite of the Wyoming type comprising a sub-bentonitic clay of the type whose yield of mud is increased by the addition thereto of soda ash containing from an effective amount to about five per cent of soda ash and from an effective amount to about five-tenths of one per cent of a water soluble salt of polyacrylic acid.

References Cited in the file of this patent

UNITED STATES PATENTS

| | | |
|---|---|---|
| 2,315,995 | Williams | Apr. 6, 1943 |
| 2,320,622 | Lindsey | June 1, 1943 |
| 2,552,775 | Fischer et al. | May 15, 1951 |

OTHER REFERENCES

Ladoo et al., Nonmetallic Minerals, 2nd edition, pages 93 to 96, pub. 1951 by McGraw-Hill Book Co. of New York.